United States Patent [19]

Kovach et al.

[11] Patent Number: 4,551,231

[45] Date of Patent: Nov. 5, 1985

[54] AMMONIA CONTACTING TO PASSIVATE METALS DEPOSITED ON A CRACKING CATALYST DURING REDUCED CRUDE PROCESSING

[75] Inventors: Stephen M. Kovach, Ashland; James L. Palmer, Flatwoods, both of Ky.

[73] Assignee: Ashland Oil, Inc., Ashland, Ky.

[21] Appl. No.: 521,503

[22] Filed: Aug. 8, 1983

Related U.S. Application Data

[63] Continuation-in-part of Ser. No. 311,725, Oct. 13, 1981, abandoned.

[51] Int. Cl.$^4$ .................... C10G 11/05; C10G 11/18; B01J 29/38
[52] U.S. Cl. .................. 208/120; 208/52 CT; 502/50; 502/54; 502/521
[58] Field of Search .................. 208/52 CT, 113, 120; 423/62, 138, 409; 405/128, 129; 502/54, 43, 521, 50

[56] References Cited

U.S. PATENT DOCUMENTS

| | | | |
|---|---|---|---|
| 1,931,550 | 10/1933 | Krauch et al. | 502/200 |
| 2,225,782 | 12/1940 | Ipatieff et al. | 502/54 |
| 2,412,868 | 12/1946 | Brown | 502/54 |
| 2,758,958 | 8/1956 | Anhorn et al. | 502/200 |
| 4,268,188 | 5/1981 | McKay et al. | 405/129 |
| 4,268,416 | 5/1981 | Stine et al. | 502/53 |
| 4,280,895 | 7/1981 | Stuntz et al. | 502/53 |
| 4,280,896 | 7/1981 | Bearden et al. | 502/53 |
| 4,348,273 | 9/1982 | Nielson | 405/128 |
| 4,417,975 | 11/1983 | Myers et al. | 208/120 |

*Primary Examiner*—P. E. Konopka
*Attorney, Agent, or Firm*—Richard C. Willson, Jr.; C. William Crady

[57] ABSTRACT

Contaminating metals including nickel, vanadium, iron and copper are deposited on a fluid cracking catalyst during the processing of carbo-metallic containing oils such as residual oils, reduced crudes or topped crudes. These contaminating metals lead to undesirous side reactions such as dehydrogenation, coking and methyl group removal which adversely affect conversion and gasoline selectively. Furthermore vanadia deactivates the crystalline zeolite component of the catalyst in addition to causing catalyst agglomeration because of its pentoxide melting point by treatment with a reducing gas such as ammonia. The ammonia is added as ammonia or in the presence of diluents such as nitrogen, carbon dioxide, flue gas, fuel gas and steam. The reaction of ammonia with vanadium produces vanadium nitride which is water insoluble and facilitates the disposal of high vanadium containing spent of deactivated catalyst by landfill techniques.

14 Claims, 1 Drawing Figure

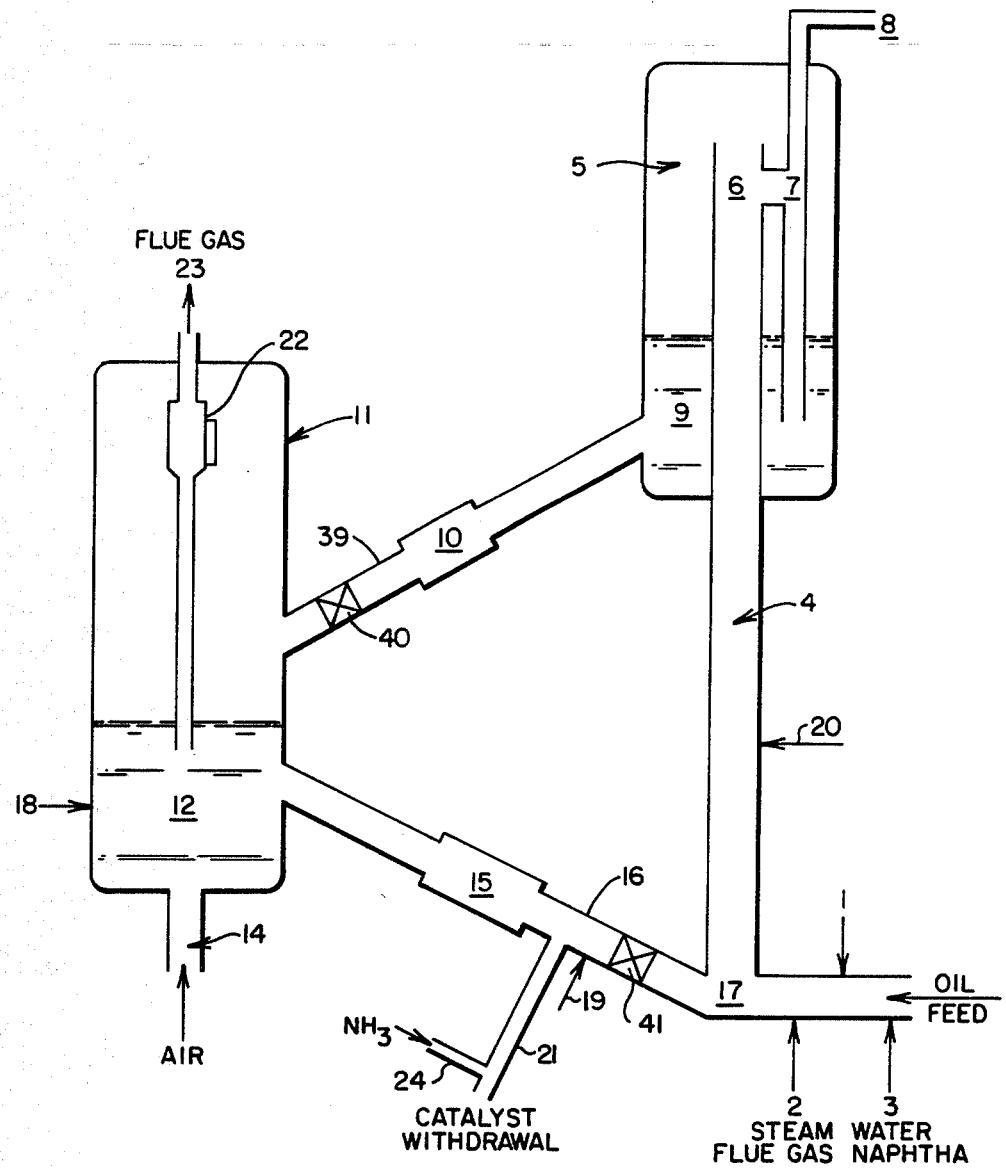

AMMONIA CONTACTING TO PASSIVATE METALS DEPOSITED ON A CRACKING CATALYST DURING REDUCED CRUDE PROCESSING

This application is a continuation in part of application Ser. No. 06/311725 filed Oct. 13, 1981, now abandoned.

TECHNICAL FIELD

This invention relates to processes for converting carbo-metallic oils into lighter fractions and especially to processes for converting heavy hydrocarbons containing high concentrations of coke precursors and heavy metals into gasoline and other liquid hydrocarbon fuels. In one aspect, the invention is related to the passivation of contaminant metals, Ni—V—Fe—Cu, deposited on the cracking catalyst during reduced crude processing by the reaction of active nitrogen containing compounds with the metal containing regenerated catalyst. In addition, the metals especially iron and vanadium can be converted to the high melting, water insoluble nitrides by reaction with ammonia which facilitates disposal of spent catalyst.

BACKGROUND ART

An important process for the conversion of the higher boiling fractions of crude oil, such as vacuum gas oil (VGO) and reduced crudes, to form gasoline and heating fuels is by fluid catalytic cracking. Fluid catalytic cracking (FCC) is commonly used to process VGO feedstocks and may be used for residual oils or reduced crudes. The residual oil feedstock is contacted in such an FCC operation with a fluidizable catalyst at elevated temperatures for short vapor contact times at low pressures; separation of catalyst and gaseous products is affected with stripping of the separated and coked catalyst followed by catalyst regeneration and recycle of the regenerated catalyst to hydrocarbon conversion to repeat the process.

One of the major problem areas in heavy oil, residual oil cracking operations is the deposition of the contaminant metals present in the (VGO) vacuum gas oil and reduced crudes on the catalyst during the fluid cracking operations. These contaminant metals include Ni—V—Fe—Cu. As the concentration of these metals increase on the catalyst, the rate of undesirable side reactions generated by these contaminant metals increases. These undesirable reactions include dehydrogenation, coking, and methyl group removal which leads to increased feedstock conversion accompanied by lower selectivity to desired products and increased coke production. The dehydrogenation reaction leads to increased hydrogen production, methyl clipping to increased methane production and the production of these light gases give decreased gasoline production (lower selectivity) and increase substantially the demand for compressor capacity to handle these light gases.

The published art teaches many techniques to handle undesirable reactions exhibited by encountered contaminant metals above identified. These techniques include contaminant metal removal and passivation. Examples of techniques for metal removal are taught and claimed in U.S. Pat. Nos. 3,122,511; 3,122,512; 3,148,155; 3,192,151 and 4,014,815. Examples of techniques for metal passivation are taught and claimed in U.S. Pat. Nos. 3,711,422 (antimony); 3,977,963 (manganese); 4,101,417 (tin); 4,192,770 (boron). Other techniques for passivating or reducing the undesirable reactions of these contaminant metals include the precoking with methane as described in U.S. Pat. No. 3,120,484; sulfiding of the metals to form the metal sulfide as described in U.S. Pat. No. 3,838,038 and copending application U.S. Ser. No. 099,050; now abandoned; the reduction of the metal oxides with hydrogen and carbon monoxide in U.S. Pat. Nos. 4,268,416; 4,280,895 and 4,280,896.

DISCLOSURE OF THE INVENTION

This invention provides a method for the passivation of particularly vanadia and iron contaminant metals distributed on a fluid cracking catalyst and containing significant levels of metal contaminants of at least about 1,000 ppm by reaction with active nitrogen containing compounds to form metal nitrides. In particular, this invention is concerned with contacting the hot regenerated fluid cracking catalyst after the regeneration operation and prior to transfer of the regenerated catalyst to the riser with ammonia or other suitable compound to reduce the contaminant metals from the oxide form to a free metal or preferably a nitride state. This invention is particularly useful in the catalytic processing of feedstocks containing high levels of Conradson carbon and contaminant metals including the passivation of the high metal containing catalyst. Another aspect of this invention is the conversion of a contaminant metal, in particular vanadium, to the water insoluble nitride form thereof of high melting point thus permitting disposal of a deactivated cracking by known landfill techniques.

It has long been known that residual oils and reduced crudes of high contaminant metals content present serious problems as to rapid catalyst deactivation at high metals loading on the catalyst, such as 5,000–10,000 ppm. It is recognized that reduced crudes with high V/Ni ratios are becoming the available norm and that high vanadium levels are causing catalyst deactivation, catalyst particle agglomeration as well as undesirable side reactions resulting in non-selective cracking of the feed and decreased selectivity to gasoline. Another attendant problem encountered with high metals level containing catalysts is related to their disposal. At the lower metal levels (1,000 ppm or less) encountered in gas oil FCC operations, spent-deactivated catalysts of relatively low contaminant metals content where disposed of by landfill technology. However, at higher levels thereof, from 5,000 to 20,000 ppm Ni+V, the question of metal leachability is raised, especially in the case of vanadium. By forming reduced metals, especially reduced vanadium, deleterious side reactions encountered during cracking are reduced and secondly, vanadia can be converted to a water insoluble form.

The problems of the prior art caused by metal containing contaminants, especially vanadium, are reduced if not overcome by employing the passivating agent and method of this invention. This invention is effective in any fluid catalyst cracking operation and particularly effective for the processing of reduced crudes and other carbo-metallic high boiling feeds high in metals such as high vanadium to nickel ratios and high Conradson carbon values.

In accordance with this invention the feed having high metal and Conradson carbon values is contacted in a hydrocarbon conversion zone such as a riser with a crystalline zeolite containing catalyst perferably of relatively high surface area at temperatures above about 950° F. Residence time of the hydrocarbon feed in the riser is maintained below 5 seconds, preferably from 0.5–2 seconds.

The crystalline zeolite catalyst is a spray dried catalyst composition in the form of microspherical particles generally in the size range of 10 to 200 microns, more usually from 20 to 150 microns and preferably between 40 and 100 microns average micron particle size to ensure adequate fluidization properties.

The heavy oil hydrocarbon feed is introduced to the riser reactor where it contacts the catalyst at a temperature of 1275°–1450° F. for a time less than 3 seconds to yield a temperature at the exit of the riser in the catalyst disengagement vessel in the range of about 950°–1100° F. Diluent materials may be added with the feed, such as water, steam, naphtha, flue gas, and combinations thereof of a heavy oil feed to aid in vaporization and act as a lift gas in a lower portion of the riser zone to control residence time of downstream introduced oil feed.

Catalyst comprising hydrocarboneous deposits and metal deposits is rapidly separated from the hydrocarbon vapors at the exit of the riser by any suitable means. The vented riser concept described in U.S. Pat. Nos. 4,066,533 and 4,070,159 to Myers, et al, may be used for this purpose or variations thereon may be employed. During the course of the reaction in the riser, metal contaminants and Conradson carbon compounds are deposited on the catalyst. After separation of hydrocarbon vapors from catalyst, the coked catalyst is collected as a dense but fluffed bed of catalyst in a bottom portion of the disengagement vessel for transfer to a stripper zone and thence to a regeneration zone. The catalyst with hydrocarboneous deposits is contacted with an oxygen containing gas in a regeneration operation to remove the carbonaceous material through combustion to carbon oxides and provide a regenerated catalyst comprising metal contaminants and less than 0.1 wt% carbon, preferably less than 0.05 wt% carbon. The regenerated catalyst is then passed to a regenerated catalyst standpipe where it is contacted with ammonia or other suitable nitriding compound for metals passivation before being recycled to the riser hydrocarbon conversion zone where it again contacts a high metal and Conradson carbon containing residual oil feed to repeat the cycle.

This application describes a new approach to offsetting the adverse effect of metal contaminants of Ni-V-Fe-Cu deposited on the catalyst, especially iron and vanadium pentoxides by treating the regenerated catalyst with a nitriding and reducing compound such as ammonia prior to further contact of the regenerated catalyst with fresh residual oil feed in the riser. This concept and approach to metals passivation with ammonia can be practiced in a separate treating vessel attached to the regenerated catalyst standpipe for passivation or conversion of particularly vanadia to vanadium nitride before removal from the system. This separate vessel can be utilized to convert vanadia to water insoluble vanadium nitride on spent-deactivated catalyst withdrawn from the unit for eventual discard or disposal by landfill techniques.

BRIEF DESCRIPTIONS OF THE DRAWING

The invention may be further better understood by reference to the following description provided in conjunction with the accompanying drawing in which:

The drawing is a schematic diagram of an apparatus arrangement for carring out the process of the invention.

BEST MODE FOR CARRYING OUT THE INVENTION

The catalysts which can be utilized in the process of this invention include those known as fluid catalytic cracking catalysts and referred to as FCC catalysts and RCC catalysts.

The active cracking zeolite in the catalysts that can be utilized in this invention is a crystalline aluminosilicate zeolite, commonly known as molecular sieves. Molecuar sieves are initially formed as alkali metal aluminosilicates, which are dehydrated forms of crystalline hydrous siliceous zeolites. However, since the alkali form does not have appreciable activity and alkali metal ions are deleterious to cracking processes, the aluminosilicates are ion exchanged to replace sodium with some other ion such as, for example, ammonium ions and/or rare earth metal ions. The silica and alumina making up the structure of the zeolite are arranged in a definite crystalline pattern containing a large number of small cavities interconnected by smaller uniform channels or pores. The effective size of these pores is usually between about 4A and 12A.

The catalytically active cracking zeolites that can be employed in accordance with this invention include both natural and synthetic zeolites. An example of natural occurring zeolites would include faujasite and the like. Suitable synthetic zeolites include zeolite Y, L, ZK-4B, B, E, F, H, J, M, Q, T, W, X, Z, ZSM-types, alpha, beta and omega. These catalytically active cracking zeolites may be used in concentration ranges from 10 to 40 weight percent and would include combinations of one or more of the active zeolites.

The matrix material of the catalysts utilized in this invention should possess good hydrothermal stability. Examples of materials exhibiting relatively stable pore characteristics are alumina, silica-alumina, silica, clays such as kaolin, meta-kaolin, halloysite, anauxite, dickite and/or macrite, and combinations of these materials. Other clays, such as montmorillonite, may be added to increase the acidity of the matrix. Clay may be used in natural state or thermally modified.

Representative feedstocks contemplated for use with the invention include whole crude oils, light fractions of crude oils such as light gas oils, heavy gas oils, and vacuum gas oils; and heavy fractions of crude oils such as topped crude, reduced crude, vacuum fractionator bottoms, other fractions containing heavy residua, coal-derived oils, shale oils, waxes, untreated or deasphalted-residua, and blends of such fractions with gas oils and the like. A high vanadium feed for FCC processing is one having more than 0.1 ppm vanadium, preferably 1.0 to 5.0 ppm where a relatively small amount of reduced crude (5–25%) is mixed with VGO to provide an FCC feedstock. A high vanadium feed for RCC processing is one having more than 1.0 ppm vanadium, preferably more than about 5.0 ppm. In either case, the preferred wight ratio of vanadium to nickel in feed without additive nickel is in the range of from about 1:3 to 5:1, more preferably greater than 1:1.

The gas oils and higher boiling feeds contemplated being cracked by the method and apparatus of the invention comprise 100% or less of 650° F.+material of which at least 5 wt%, preferably at least 10 wt%, does not boil below about 1025° F.

A carbo-metallic residual oil feed for purposes of this invention is one having a heavy metal content of at least about 4 ppm nickel equivalents. The nickel equivalents being determined by the formula: Ni eq.=Ni+V/4.8-+Fe/7.1+Cu/1.23. A Conradson carbon residue value greater than about 1.0, and a vanadium content of at least 1.0 ppm is particularly contemplated.

The feedstocks for which the invention is particularly useful will have a heavy metal content of at least about 5 ppm nickel equivalents, a vanadium content of at least 2.0 ppm, and a Conradson residue of at least about 2.0. The greater the heavy metal content and the greater the proportion of vanadium in that heavy metal content, the more advantageous the passivating agent and processes of this invention becomes. A particularly preferred feedstock for treatment by the process of the invention includes a reduced crude comprising 70% or more of a 650° F.+material having a fraction thereof greater than 20% boiling about 1025° F. at atmospheric pressure, a metals content of greater than 5.5 ppm nickel equivalents of which at least 5 ppm is vanadium, a vanadium to nickel atomic ratio of at least 1.0, and a Conradson carbon residue greater than 4.0. This feed may also have a hydrogen to carbon ratio of less than about 1.8 and coke precursors in an amount sufficient to yield about 4 to 14% coke by weight based on fresh feed. The feed is preferably pretreated to remove sodium to a level less than 1 ppm.

With respect to the tolerance levels of heavy metals on the catalyst itself, such metals may accumulate on an catalyst to levels in the range of 100 to 10,000 ppm total metals, usually above 1,000 ppm, of which 5 to 100%, preferably 20 to 80%, is vanadium. Such metals may also accumulate on the catalyst to levels in the range of from about 3,000 to about 30,000 ppm total metals, more usually 5,000 ppm or greater, of which 5 to 100%, preferably 20 to 80% is vanadium.

The catalytic cracking reaction contemplated by the method of the invention is sufficiently severe to convert from 50 to 90 percent of the carbo-metallic residual oil feed to gasoline and cycle oils with coke in amounts of 4 to 14 percent by weight based on weight of fresh feed. This coke or carbonacous material is laid down on the catalyst in amounts in the range of about 0.3 to 3 percent by weight of catalyst, depending upon the catalyst to oil ratio (weight of catalyst to weight of feedstock) in the riser.

The 630° F. plus feed, with or without hydrogenation pretreatment, is introduced in one embodiment as shown in the drawing into the bottom of the riser conversion zone along with a suspension of hot cracking catalyst obtained in accordance with this invention. Steam, naphtha, water, flue gas and/or other suitable diluent generated is introduced into the riser separately or along with the residual oil feed. These diluents may be from a fresh source or may be recycled from a process stream in the refinery. Where recycle diluent streams are used, they may contain hydrogen sulfide and other sulfur compounds which may help passivate some adverse metal contaminant catalytic activity by the heavy metals accumulating on the catalyst. It is to be understood that water diluents may be introduced either as a liquid or as steam. Water is added as a heat sink and source of vapor for dispersing the residual oil feed as well as accelerate the feed catalyst suspension to achieve a vapor velocity and residence time desired. Diluents increase the vapor velocity as above recited and lower the feed partial pressure in the riser reaction zone.

As the feed travels up the riser on contact with catalyst particles as a suspension thereof it is vaporized considerably and cracked to form products known in the industry as dry gas, wet gas, catalytic naphtha, light cycle oil, heavy cycle oil and slurry oil. At the upper discharge end of the riser, the catalyst particles are separated from product hydrocarbon vapors as previously described. The separated catalyst particles contain deposited coke formed in the riser which is stripped and then sent to the regenerator to burn the coke with oxygen with gas. The separated hydrocarbon product vapors are sent to a fractionation zone for separation into desired products. The regenerated catalyst is treated in accordance with this invention with an ammonia stream in the regenerated catalyst standpipe or other suitable location prior to transfer to the riser hydrocarbon conversion zone or withdrawal for discard. In addition to treating metal contaminated catalyst with ammonia, the metals on the equilibrium catalyst can be passivated-nitrided by the addition of ammonia in diluents such as nitrogen, carbon dioxide, flue gas, fuel gas and steam alone or with other active nitrogen containing compounds such as amines, amides, and like materials which will nitride the metals as desired.

Some desired riser operating conditions for an FCC process are summarized in Table A. In this table, the abbreviations used have the following meanings: "Temp." for temperature, "Dil," for diluent, "pp" for partial pressure, "wgt" for weight, "V" for vapor, "Res." for residence, "C/O" for catalyst to oil ratio, "Cat." for catalyst, "bbl" for barrel, "MAT" for microactivity test, "Vel." for velocity, "cge" for charge, "d" for density and "Reg." for regenerated.

TABLE A

| HYDROCARBON CONVERSION RISER CONDITIONS | | |
|---|---|---|
| Parameter | Broad Operating Range | Preferred Range |
| Feed Temp. | 400–800° F. | 400–650° F. |
| Steam Temp. | 200–500° F. | 300–400° F. |
| Reg. Catalyst Temp. | 1000–1500° F. | 1175–1350° F. |
| Riser Exit Temp. | 900–1400° F. | 925–1050° F. |
| Pressure | 0–100 psia | 10–50 psia |
| Water/Feed | 0.01–0.30 | 0.01–0.15 |
| Dil. pp/Feed pp | 0.15–3.0 | 1.25–2.5 |
| Dil. wgt/Feed wgt | <0.4 | 0.01–0.3 |
| V. Res Time (sec) | 0.01–5 | 0.05–3 |
| C.O, wgt. | 3–18 | 5–12 |
| Lbs. Cat./bbl Feed | 0.01–4.0 | 0.05–2 |
| Inlet Cat. Mat | >50 vol. % | 60–85 |
| Outlet Cat. Mat | >20 vol. % | >40 |
| V. Vel. | 25–90 ft./sec. | 30–60 |
| V. Vel./Cat. Vel. | >1.0 | 1.2–2.0 |
| Dil. Cge. Vel. | 5–90 ft./sec. | 10–50 |
| Oil Cge. Vel. | 1–50 ft./sec. | 5–50 |
| Inlet Cat. d | 1–9 lbs./ft. 3 | 2–6 |
| Outlet Cat. d | 1–6 lbs./ft. 3 | 1–3 |

In a process for cracking carbo-metallic containing feedstocks, the regenerating gas may be substantially any gas which provides oxygen to convert carbon to carbon oxides. Air is highly suitable for this purpose in view of its availability. The amount of air required per pound of coke for combustion depends upon the desired carbon dioxide to carbon monoxide ratio in the effluent flue gases and upon the amount of other combustible materials present in the coke, such as hydrogen, sulfur, nitrogen and other elements capable of forming gaseous oxides at regenerator conditions.

The regenerator is maintained at temperatures in the range of about 1000° to 1600° F., preferable 1275° to about 1450° F., by controlling the amount and rate of $O_2$ charged to achieve combustion of hydrocarbonaceous deposits while keeping the catalyst temperatures below those at which any significant hydrothermal catalyst degradation can occur. In order to control these temperatures, it is necessary to control the rate of burning which in turn can be controlled at least in part by the relative amounts of oxidizing gas and carbon introduced into the regeneration zone per unit time. With reference to the drawing, the rate of introducing carbon content catalyst into the regenerator may be controlled by regulating the rate of flow of coked catalyst through valve 40 in conduit 39; the rate of removal of regenerated catalyst by regulating valve 41 in conduit 16; and by the rate of introducing oxidizing gas by the speed of operation of blowers (not shown) supplied by air to conduit 14. These operating parameters may be regulated such that the ratio of carbon dioxide to carbon monoxide in the effluent gases is equal to greater or less than about 1.0 and preferably about 1.5 or more. In addition, water, either as a liquid or as steam, may be added to the regenerator to assist with controlling temperatures and to influence a high carbon dioxide to carbon monoxide ratio.

The regenerator combustion reaction is carried out so that the amount of carbon remaining on regenerated catalyst is less than about 0.25, preferably less than about 0.05 percent on a substantially moisture-free weight basis. The residual carbon level is ascertained by conventional techniques which include drying the catalyst at 1100° F. for about four hours before actually measuring the carbon content so that the carbon level obtained is on a moisture-free basis.

The catalyst utilized in this invention is charged to a FCC unit generally represented by the drawing or other configurations suitable for effective Reduced Crude Conversion (RCC). Catalyst particle circulation and operating parameters are brought up to process conditions by methods well-known to those skilled in the art. The catalyst in conduit 16 at a temperature in the range of 1100°–1500° F. contacts the oil feed at the bottom of riser 4 at 17 in one arrangement or downstream thereof by conduit 20. The feed can contain steam and/or flue gas injected at point 2 or water and/or naphtha injected at point 3 or as required to conduit 20 to aid in feed vaporization, catalyst fluidization and controlling the hydrocarbon contact time in riser 4 within desired limits. The catalyst and vaporous hydrocarbons travel up riser 4 at a contact time in the range of 0.1–5 seconds, preferably in the range of 0.5–3 seconds. The catalyst and vaporous hydrocarbons are separated in vented riser outlet arrangement or other arrangement 6 at a conversion reaction temperature preferably in the range of 900°–1100° F. The vaporous hydrocarbons are transferred to a multistage cyclone represented by 7 wherein entrained catalyst fines in the vaporous product are separated and the hydrocarbon vapors are sent to a fractionator (not shown) via transfer line 8. The coked catalyst is then transferred to stripper 10 for removal of entrained hydrocarbon vapors and then to regenerator vessel 11 to form a dense fluidized catalyst bed 12. An oxygen containing gas such as air is admitted to the bottom of dense catalyst bed 12 in vessel 11 by conduit 14 to combust the coke, carbonacous material to carbon oxides. The resulting flue gas is processed through cyclones represented by cyclone 22 and exits from regenerator vessel 11 via line 23. The regenerated catalyst is transferred to stripper 15 to remove any entrained oxygen containing combustion gases, and then treated with ammonia introduced at point 19 before being transferred to the riser bottom at 17 via conduit 16 to repeat the cycle. On the other hand a portion of the regenerated catalyst may be withdrawn by conduit 21 and treated with ammonia charged by conduit 24.

At such time that the metal level on the catalyst becomes intolerably high such that catalyst activity and selectivity declines, additional catalyst can be added by conduit 18 into the dense bed 12 of regenerator 11.

The regenerated equilibrium catalyst that is withdrawn via line 21 is treated with gaseous ammonia or other suitable material identified either alone or in admixture with diluents such as nitrogen, carbon dioxide, flue gas or steam. This treatment with ammonia converts the water soluble vanadium oxides to the water insoluble vanadium nitride of relatively high melting point. Thus the spent regenerated equilibrium catalyst containing relatively high concentrations of vanadium up to 20,000 ppm can be disposed of by normal landfill techniques without releasing concentrations of leached vanadia into any aqueous medium present.

Passivation Studies

The techniques available to determine the cracking and coking reactions of metals deposited on fluid cracking catalysts are varied. The method employed herein contacts a pure hydrocarbon with a metal loaded fluid cracking catalyst at elevated temperatures and the gaseous products are collected and analyzed by gas chromatography. The results are given in Table B.

TABLE B

| Conditions: | 950° F. 0 psig. | |
|---|---|---|
| Feed: | Methylcyclohexane (MCH) - 3 g/3 min. | |
| Catalyst: | 20 g of 1% $V_2O_5$ on an Equilibrium Super DX From FCC Operations | |
| Catalyst Pretreat | 1 Hour - Air 1100° F. | 1 Hour - Air 1 Hour - $NH_3$ 1100° F. |
| MCH—Feed-g | 2.96 | 3.16 |
| Products-g | | |
| $H_2$ | 0.01 | 0.008 |
| $C_1-C_2$ | 0.05 | 0.04 |
| $C_3-C_6$ | 1.52 | 2.44 |
| MCH | 0.85 | 1.38 |
| BTX | 0.39 | 0.24 |
| COKE | 1.14 | 0.05 |

As noted in Table B, the treatment of the catalyst containing 1% $V_2O_5$ in air ensured the vanadium being in the oxide form. The catalysts treated in air and in air followed by ammonia had methylcyclohexane processed over them at 950° F. The gaseous and liquid products were collected and analyzed by (GC) gas chromatography. Comparison of the product distributions from these two runs shows that ammonia not only passivated the undesirous hydrocarbon reactions of vanadia but also improved the cracking activity of the catalyst: ammonia treatment reduced dehydrogenation by 20%, reduced methyl group removal by 20%, reduced coking by at least 60% and increased the cracking activity of the catalyst by at least 50%.

Leaching—Solubility Studies

In the practice of FCC processing of vacuum gas oils, metals accumulation on catalysts are kept at low levels, of about 1,000 ppm Ni+V. Spent and deactivated catalysts is withdrawn from a FCC unit and discarded by known landfill techniques. Due to the relatively low metals level on the catalyst, heavy metal leaching is not considered a problem. However, with the advent of Reduced Crude Processing (RCC), much higher levels of metals (Ni+V+Fe+Cu) are deposited on the catalyst, such as 5,000-20,000 ppm thereof. In addition, the metal contaminant content has shifted towards a high V/Ni ratio in the region of 3-5/1 when processing residual oils and reduced crudes.

To determine the leachability of these metals, especially Ni-V-Fe-Cu, a leachability study was made on two catalysts having a low level and a high level of the metals. These catalysts were treated with acidic, neutral and alkaline water to simulate acid rain, neutral and alkaline soil leach waters. The results are given in Tables C and D.

TABLE C

| | 100 g Catalyst Hi-Metals 250 ml. Extraction Solution | | | |
|---|---|---|---|---|
| | PPM | | | |
| | Ni | V | Fe | Cu |
| Catalyst | 3600 | 4300 | 8800 | 85 |
| Extract Solution | Metals Concentration In Solution | | | |
| pH 3.0 | <1 | 124 | <1 | <1 |
| pH 6.5 | <1 | 142 | <1 | <1 |
| pH 10.0 | <1 | 145 | <1 | <1 |

TABLE D

| | 100 g Catalyst Low-Metals 250 ml. Extraction Solution | | | |
|---|---|---|---|---|
| | PPM | | | |
| | Ni | V | Fe | Cu |
| Catalyst | 200 | 600 | 5000 | 30 |
| Extract Solution | Metals Concentration in Solution | | | |
| pH 3.0 | <1 | 5 | <1 | <1 |
| pH 6.5 | <1 | 22 | <1 | <1 |
| pH 10.0 | <1 | 58 | <1 | <1 |

The results obtained on extracting the low and high metals containing catalysts show the Ni-Fe-Cu are not leached to any significant extent. However, vanadium is leached in any type water to a large extent, as shown in Tables C and D.

To demonstrate the unique properties of a vanadium containing catalyst that had been treated with ammonia to form a nitride thereof, the vanadium containing catalyst treated with ammonia as identified in Table B was tested in the same water leachability studies demonstrated in Tables C and D. The amount of vanadium nitride leached was non-detectable, that is <1 ppm was found in the leach-extraction solution. This insolubility of vanadium (subject to ammonia treat) is attributed to the formation of vanadium nitride, a highly insoluble compound.

Industrial Applicability

The invention is useful in the catalytic conversion of both gas oil and heavier RCC feeds as described herein. The present invention is particularly useful in the catalytic cracking of high boiling carbo-metallic containing residual oil feedstocks to form lower boiling liquid hydrocarbon fractions in the liquid fuel range. Examples of these heavier oil feeds are reduced crudes, topped crude, residuum containing high values of Conradson carbon and contaminant metals, especially vanadium. The application of the nitriding principles of this invention leads to contaminant metal passivation and to lowered rates of dehydrogenation, methyl group removal and coking. The conversion of vanadia on discarded spent high metals containing cracking catalyst to a water insoluble nitride form facilitates disposal as by landfill techniques.

Improvements in product distribution obtained following vanadia and other ion passivation by nitriding thereof as herein identified is more particularly demonstrated by the following described processing results.

Referring now to Table E presented below, there is provided feedstock analysis for two different feeds A and B. It will be noted that the Rambsbottom carbon for feed B is less than that of feed A, the total nitrogen is much higher and the nickel and vanadium content thereof is generally higher than found in feed A.

TABLE E

FEEDSTOCK ANALYSIS
735 TANK REDUCED CRUDE

| | Feed A | Feed B |
|---|---|---|
| Date | 8/8/80 | 2/7/81 |
| API | 20.0 | 20.0 |
| Sulfur, Wt. % | 2.50 | 1.9-2.4 |
| UOPK | 11.54 | 11.55 |
| Distillation: 5% | 554 | 555 |
| 10% | 609 | 612 |
| 20% | 668 | 680 |
| 30% | 710 | 723 |
| 40% | 763 | 765 |
| 50% | 810 | 818 |
| 60% | 885 | 875 |
| 70% | 952 | 938 |
| 80% | 993 | 991 |
| | CRX @ 999 | CRX @ 1000 |
| Vis, cs @ 210° F. 2.1 | 10.5 | |
| Ramsbottom Carbon, Wt. % | 6.0 | 4.6 |
| Basic Nitrogen, ppm | — | 400-480 |
| Total Nitrogen, ppm | 1500 | 1700-2000 |
| Heptane Insolubles, % | 2.3 | 2.7 |
| Metals: | | |
| Iron, ppm | 4 | 3-6 |
| Nickel, ppm | 9 | 53-72 |
| Vanadium, ppm | 30 | |
| Sodium, ppm | 14 | 1-2 |
| Copper, ppm | <1 | <1 |

8/8/80 100% Arabian Light Reduced Crude
2/7/81 38.5% VGO, 31.5% ABL, 15.2% Mayan, 14.8% ITHM

TABLE F

PRODUCT DISTRIBUTION UNIT
THE EFFECT OF NITROGEN ON CRACKABILITY
NITROGEN ADDED AS AMMONIA TO CATALYST

Catalyst Equilibrium Super DX
MAT Conv/R.A. 73.97/89
Metals, ppm 3100 (¼ Ne + V)
Feedstock "A": 735 Tank 8/8/80 ABL Reduced Crude (TABLE E)
% API Gr.      20.0
Ramsbottom C.  6.0

TABLE F-continued

PRODUCT DISTRIBUTION UNIT
THE EFFECT OF NITROGEN ON CRACKABILITY
NITROGEN ADDED AS AMMONIA TO CATALYST

| | | | | | | | | |
|---|---|---|---|---|---|---|---|---|
| Sulfur, Wt. % | 2.50 | | | | | | | |
| N, ppm, Total | 1500 | | | | | | | |
| Heptane Insol. | 2.3 | | | | | | | |
| Metals, Ni + V, ppm | 39 | | | | | | | |
| ppm, Nitrogen In $NH_3$ Added | 0 | | 1000 | | 2000 | | 10,000 | |
| Test # | 114 | | 124 | | 130 | | 181 | |
| Conditions | | | | | | | | |
| °F. | 1000 | | 1000 | | 1000 | | 1000 | |
| Cat/Oil | 7.17 | | 7.4 | | 7.0 | | 6.48 | |
| WHSV | 16.742 | | 16.254 | | 17.136 | | 18.520 | |
| Feed Diluent | $N_2$ + Steam | | $N_2$ + Steam | | $N_2$ + Steam | | $N_2$ + Steam | |
| Product Dist. | Wt. % | Vol. % | Wt. % | Vol. % | Wt. % | Vol. % | Wt. % | Vol. % |
| $H_2$ | 0.26 | | 0.17 | | 0.21 | | 0.25 | |
| $C_1$ | 2.34 | | 1.64 | | 2.22 | | 1.75 | |
| $C_2$'s | 2.72 | | 2.49 | | 2.82 | | 1.90 | |
| $C_3$ | 3.50 | 6.45 | 3.08 | 5.67 | 3.95 | 7.28 | 2.48 | 4.58 |
| $C_3=$ | 4.94 | 8.87 | 4.76 | 8.55 | 4.78 | 8.59 | 4.14 | 7.44 |
| $iC_4$ | 8.84 | 14.72 | 9.01 | 15.01 | 8.41 | 14.01 | 7.97 | 13.28 |
| $iC_4= + 1-C_4=$ | 1.77 | 2.76 | 1.95 | 3.04 | 1.55 | 2.42 | 1.55 | 2.42 |
| $nC_4$ | 2.72 | 4.36 | 2.76 | 4.42 | 2.66 | 4.26 | 2.28 | 3.65 |
| $2-C_4=$ (c,t) | 2.05 | 3.04 | 2.29 | 3.47 | 1.77 | 2.70 | 1.81 | 2.75 |
| $CO, CO_2, CO_5, H_2S$ | 0.80 | 0.96 | 0.72 | 0.86 | 0.75 | 0.90 | 0.30 | 0.36 |
| $C_5$–430° F. | 36.07 | 47.28 | 39.14 | 51.25 | 39.08 | 51.07 | 44.72 | 57.63 |
| 430-630° F. | 11.10 | 11.78 | 10.91 | 11.58 | 11.73 | 12.45 | 15.43 | 16.96 |
| >630° F. | 9.11 | 7.95 | 8.93 | 7.37 | 7.28 | 6.72 | 1.56 | 1.56 |
| Coke | 13.80 | | 12.17 | | 12.77 | | 13.87 | |
| Conversion of >430° F., Vol. % | | 80.27 | | 81.05 | | 80.83 | | 81.48 |
| Selectivity, $C_5$–430° F., Vol. % | | 58.90 | | 63.23 | | 63.18 | | 70.73 |
| Gasoline (80–430° F.) | | | | | | | | |
| RONC | 91.2 | | 89.8 | | 91.7 | | 91.2 | |
| Br. No. | 17.4 | | 10.9 | | — | | 12.2 | |
| FIA-Saturates | 47.7 | | 44.8 | | 46.3 | | 50.5 | |
| Olefin | 4.6 | | 4.3 | | 4.0 | | 5.7 | |
| Aromatics | 47.7 | | 50.9 | | 49.7 | | 43.8 | |

TABLE G

PRODUCT DISTRIBUTION UNIT
THE EFFECT OF NITROGEN ON CRACKABILITY
NITROGEN ADDED AS AMMONIA TO CATALYST

Catalyst Equilibrium Super DX
MAT. Conv/R.A. 73.97/89
Metals, ppm 3100 (½Ni + V)
Feedstock "B" 735 Tank 2/7/81 (TABLE E)

| | | |
|---|---|---|
| % API Gr. | 20.0 | |
| Ramsbottom C. | 4.6 | |
| Sulfur, Wt % | 1.9–2.4 | |
| N, ppm, Total/Basic | 1700–2000/400–480 | |
| Heptane Insol. | 2.7 | |
| Metals, Ni + V, ppm | 66–89 | |

| | | | | | | |
|---|---|---|---|---|---|---|
| pp, Nitrogen In $NH_3$: Added | 0 | | 1000 | | 20000 | |
| Test # | 125 | | 123 | | 129 | |
| Conditions | | | | | | |
| °F. | 1000 | | 1000 | | 1000 | |
| Cat/Oil | 6.5 | | 6.6 | | 7.2 | |
| WHSV | 18.447 | | 18.145 | | 16.787 | |
| Feed Diluent | $N_2$ + Steam | | $N_2$ + Steam | | $N_2$ + Steam | |
| Product Dist. | Wt. % | Vol. % | Wt. % | Vol. % | Wt. % | Vol. % |
| $H_2$ | 0.25 | | 0.21 | | 0.21 | |
| $C_1$ | 2.33 | | 2.01 | | 2.04 | |
| $C_2$'s | 3.93 | | 2.82 | | 2.70 | |
| $C_3$ | 1.09 | 2.01 | 3.59 | 6.62 | 3.75 | 6.90 |
| $C_3=$ | 6.71 | 12.06 | 4.88 | 8.77 | 4.83 | 8.68 |
| $iC_4$ | 2.01 | 3.35 | 8.56 | 14.26 | 8.38 | 13.96 |
| $iC_4+ 1-C_4=$ | 6.08 | 9.48 | 1.83 | 2.86 | 1.48 | 2.30 |
| $nC_4$ | 0.66 | 1.06 | 2.75 | 4.42 | 2.59 | 4.15 |
| $2-C_4=$ (c,t) | 4.23 | 6.41 | 2.09 | 3.17 | 1.70 | 2.58 |
| $CO, Co_2, CO_5, H_2S$ | 0.06 | 0.07 | 0.52 | 0.62 | 0.71 | 0.85 |
| $C_5$–430° F. | 38.09 | 49.25 | 37.91 | 49.71 | 39.85 | 51.76 |

TABLE G-continued
PRODUCT DISTRIBUTION UNIT
THE EFFECT OF NITROGEN ON CRACKABILITY
NITROGEN ADDED AS AMMONIA TO CATALYST

| | | | | | | |
|---|---|---|---|---|---|---|
| 430–630° F. | 12.91 | 13.70 | 12.66 | 13.44 | 12.39 | 13.15 |
| >630° F. | 9.83 | 9.08 | 9.68 | 8.86 | 7.76 | 7.16 |
| Coke | 11.83 | | 10.48 | | 11.63 | |
| Conversion of >430° F., Vol. % | | 77.22 | | 77.70 | | 70.69 |
| Selectivity, C$_5$–430° F., Vol. % | | 63.78 | | 63.98 | | 64.95 |
| Gasoline (80–430° F.) | | | | | | |
| RONC | 93.2 | | 92.1 | | 91.1 | |
| Br. No. | 11.1 | | 13.5 | | 13.8 | |
| FIA-Saturates | 40.8 | | 46.3 | | 50.4 | |
| Olefin | 5.0 | | 4.0 | | 3.8 | |
| Aromatics | 54.2 | | 49.7 | | 45.8 | |

The heavy oil feeds identified in Table E above provided were converted with a crystalline zeolite containing cracking catalyst known in the industry as Super DX and produced by Davison Company. The conversion data obtained with feed "A" and reaction conditions employed are identified in Table F and that obtained for feed "B" is identified in Table G.

It is observed upon examination of the data of Table F, that the addition of ammonia as herein provided to the conversion operation provided a higher gasoline yield than was achieved in test run 114. Furthermore the yield of a 430°–630° F. cycle oil product is higher in test 181 than achieved in the absence of ammonia addition in test 114. Thus even though the line of conversion remained substantially the same, the selectivity to C5 plus gasoline product was higher in the absence of any significant increase in coke make. These results are unexpected and not predictable.

As identified above feedstock "B" is of a substantially different composition and comprises a higher line of metal contaminants as well as a higher total nitrogen content. When this feedstock B was catalytically converted as provided in Table G, the levels of nitrogen provided in Tests 123 and 129 by ammonia addition did not adversely effect the yield of gasoline and cycle oil. However in Test 129 it is found that the yield of 630° F. plus material is reduced; the level of conversion is slightly increased and the selectivity is also slightly improved. It is further observed that the yields of saturate materials such as propane and butane are increased as well as the yield of isobutane. Thus the Test runs of Table G clearly establish the product yields improvement obtained by the addition of nitrogen as ammonia to the catalyst. The addition of ammonia as herein provided improved the catalyst conversion selectivity.

It is thus clear from these data that as the ammonia addition is increased so also does the selectivity of the conversion operations increase in the production of gasoline and cycle oil (430°–630° F. material). Furthermore as the ammonia addition is increased the 630° F. plus slurry oil decreases.

Having thus generally described the invention and discussed specific examples in support thereof, it is to be understood that no undue restrictions are to be imposed by reason thereof except as defined by the following claims.

We claim:

1. A process for passivating metal contaminants of an equilibrium zeolite fluid cracking catalyst containing vanadium and nickel contaminants which arise from use of said catalyst in continuous fluid catalytic cracking of a carbometallic heavy hydrocarbon oil feed, said process comprising contacting said catalyst, after regeneration thereof, with ammonia in an amount sufficient to convert at least a portion of said contaminant metals from an oxide form to nitrides and reusing the passivated catalyst in a continuous fluid catalytic cracking process.

2. Process according to claim 1 in which the amount of ammonia employed is in the range of from about 1000 ppm to 20,000 ppm, based on nitrogen in said ammonia.

3. Process according to claim 1 in which the regenerated catalyst is contacted with ammonia at a temperature in the range of 1000° F. to 1500° F.

4. The process of claim 1 wherein said equilibrium zeolite fluid cracking catalyst contains at least 1000 ppm vanadium and nickel contaminants, calculated as metals.

5. A process for fluid catalytic cracking comprising the sequential steps of:
   (a) cracking in a hydrocarbon conversion zone a hydrocarbon feed containing at least 5 ppm metals as nickel and vanadium and having a Conradson carbon of at least 2 wt.% in the presence of equilibrium zeolite cracking catalyst containing at least 1000 ppm vanadium and nickel contaminants,
   (b) separting vaporous hydrocarbon conversion products to yield a coked catalyst,
   (c) regenerating said coked catalyst in a regeneration zone at conditions sufficient to remove at least a portion of any carbonaceous deposits whereby the metal contaminants are converted to an oxide form to produce a regenerated catalyst,
   (d) stripping said regenerated catalyst to remove occluded regeneration gases,
   (e) contacting the stripped catalyst in a passivation zone with ammonia in an amount sufficient to convert vanadium pentoxide to vanadium nitride to form a passivated catalyst, and
   (f) recycling said passivated catalyst to said hydrocarbon conversion zone.

6. Process according to claim 5 in which coked catalyst is regenerated at a temperature in the range of 1275° F. to 1450° F.

7. The method of claim 5 wherein regenerated catalyst is withdrawn by a standpipe zone communicating with said regeneration zone and said withdrawn catalyst is contacted with ammonia in said standpipe.

8. The method of claim 5 wherein the regenerated catalyst is contacted with ammonia under conditions to convert at least a portion of vanadia and iron oxides to nitrides thereof.

9. The method of claim 5 wherein said hydrocarbon feed is selected from whole crude oils, atmospheric and/or vacuum gas oils, topped crudes, reduced crudes, residual oils, reduced crudes, coal-derived oils, shale oils, waxes, untreated or deasphalted residia and blends thereof comprising from 1 to 5 ppm vanadium.

10. The method of claim 5 wherein the weight ratio of vanadium to nickel in the feed is in the range of 1:3 to 5:1.

11. The method of claim 5 wherein the hydrocarbon feed comprises 70% or more of 650° F. plus material and greater than 20% thereof boils above 1025° F. at atmospheric pressure.

12. A process for fluid catalytic cracking comprising the steps of:
  (a) cracking in a hydrocarbon conversion zone a carbometallic hydrocarbon feed at a pressure of about 10-50 psia and at temperatures of about 925° F.-1050° F. in the presence of a zeolite catalyst contaminated with vanadium compounds,
  (b) regenerating coked catalyst at conditions wherein vanadium pentoxides are produced,
  (c) passing the regenerated catalyst to a stripping zone and stripping entrained oxygen containing gas from the catalyst,
  (d) contacting the stripped catalyst with ammonia to convert vanadium pentoxides to vanadium nitride and thereby to passivate said catalyst,
  (e) removing a minor portion of the passivated catalyst containing at least 1000 ppm vanadium from the cracking process for disposal in a landfill and
  (f) recycling a major portion of the passivated catalyst to said hydrocarbon conversion zone.

13. The process of claim 12, wherein the minor portion of the passivated catalyst contains from about 5000 to 20,000 ppm nickel and vanadium, calculated as metals.

14. The method of claim 1 wherein regeneration of the catalyst is accomplished at a temperature in the range of 1275° F. to 1450° F.

* * * * *